US011390454B2

(12) United States Patent
Glaesser et al.

(10) Patent No.: US 11,390,454 B2
(45) Date of Patent: Jul. 19, 2022

(54) CAPSULE AND BEVERAGE SYSTEM FOR PRODUCING A BEVERAGE

(71) Applicant: BSH HAUSGERAETE GMBH, Munich (DE)

(72) Inventors: Tim Glaesser, Ruesselsheim (DE); Peter Nober, Rommersheim (DE); Evgeni Rehfuss, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 60 days.

(21) Appl. No.: 16/636,186

(22) PCT Filed: Jul. 19, 2018

(86) PCT No.: PCT/EP2018/069576
§ 371 (c)(1),
(2) Date: Feb. 3, 2020

(87) PCT Pub. No.: WO2019/025195
PCT Pub. Date: Feb. 7, 2019

(65) Prior Publication Data
US 2020/0377292 A1    Dec. 3, 2020

(30) Foreign Application Priority Data

Aug. 2, 2017 (DE) .......................... 102017213368.6

(51) Int. Cl.
*B65D 85/804* (2006.01)
*A47J 31/40* (2006.01)

(52) U.S. Cl.
CPC ........ *B65D 85/8043* (2013.01); *A47J 31/407* (2013.01); *B65D 85/8049* (2020.05); *B65D 85/8052* (2020.05)

(58) Field of Classification Search
CPC ............ B65D 85/8043; B65D 85/8049; B65D 85/8052; A47J 31/407
(Continued)

(56) References Cited

U.S. PATENT DOCUMENTS 9,764,891 B1\* 9/2017 Aviles ................ B65D 85/8043
2001/0048957 A1\* 12/2001 Lazaris .............. B65D 85/8043
426/77
(Continued)

FOREIGN PATENT DOCUMENTS

WO    2015124526 A1    8/2015
WO    2015124534 A1    8/2015
(Continued)

*Primary Examiner* — Viren A Thakur
*Assistant Examiner* — Chaim A Smith
(74) *Attorney, Agent, or Firm* — Laurence A. Greenberg; Werner H. Stemer; Ralph E. Locher

(57) ABSTRACT

A capsule for holding ingredients for the production of a beverage has a capsule body, which is at least partly covered on a top side of the capsule by a cover and which surrounds a first chamber for holding a first ingredient. In addition, the capsule has a chamber wall, which surrounds a channel-shaped cavity, which extends from the top side of the capsule to a bottom side of the capsule. The capsule further has a valve element, with which a first outlet opening of the first chamber can be opened at the chamber wall by a rod inserted into the cavity from the top side of the capsule, so that the ingredients can flow from the first chamber via the cavity and out of the capsule at the bottom side of the capsule.

24 Claims, 12 Drawing Sheets

(58) Field of Classification Search
USPC ............ 220/203.04, 203.05, 203.06, 203.19, 220/203.22; 222/308
See application file for complete search history.

(56) References Cited

U.S. PATENT DOCUMENTS

| | | | | |
|---|---|---|---|---|
| 2009/0223375 | A1* | 9/2009 | Verbeek ................ | A47J 31/405 |
| | | | | 99/287 |
| 2012/0096876 | A1* | 4/2012 | Ravji ...................... | A23G 9/12 |
| | | | | 62/68 |
| 2012/0251668 | A1* | 10/2012 | Wong ................ | B65D 85/8043 |
| | | | | 426/77 |
| 2012/0263831 | A1* | 10/2012 | Skalski .................. | A47J 31/46 |
| | | | | 426/78 |
| 2018/0242776 | A1* | 8/2018 | Schaling ............... | B65B 29/022 |

FOREIGN PATENT DOCUMENTS

| | | | |
|---|---|---|---|
| WO | 2016081477 | A3 | 5/2016 |
| WO | 2017046158 | A1 | 3/2017 |

* cited by examiner

CAPSULE AND BEVERAGE SYSTEM FOR PRODUCING A BEVERAGE

BACKGROUND OF THE INVENTION

Field of the Invention

The invention relates to a capsule and a beverage system for producing a beverage.

In a capsule-based beverage system, the ingredients of a capsule inserted into the beverage system can be mixed with a further liquid (e.g. water) in order to make available a portion of a beverage. For the reliable production of mixed beverages, it is typically necessary that the ingredients of a capsule are transferred as completely as possible from the capsule into the mixed beverage. Furthermore, in the production of a mixed beverage, contamination of the beverage system by ingredients from a capsule is to be avoided, in particular so as to be able to use the beverage system cost-effectively for the production of different mixed beverages.

The present document addresses the technical problem of making available a capsule and a beverage system by which reliable and cost-effective production of complex mixed beverages is permitted.

BRIEF SUMMARY OF THE INVENTION

The problem is solved by the subject matter of the independent claims. Advantageous embodiments are in particular defined in the dependent claims, described in the description below or shown in the accompanying drawing.

According to one aspect of the invention, a capsule, in particular a multi-chamber capsule, for the production of a beverage is described. The capsule can contain the ingredients for exactly one portion (e.g. for one glass) of an (alcoholic or non-alcoholic) beverage. For the production of a beverage, the ingredients of a capsule can be conveyed substantially completely out of the one or more chambers of the capsule. Typically, after the production of a beverage, there are therefore substantially no ingredients left in the capsule.

The capsule comprises a capsule body, which is at least partially covered on a top side of the capsule by a lid (in particular by a sealing foil). The capsule body and the lid enclose a first chamber for holding a first ingredient and, if appropriate, a second chamber for holding a second ingredient. The separate storage of different ingredients (in particular different liquids) in different chambers permits an increased storage life of a capsule.

The capsule moreover comprises a chamber wall, which encloses a channel-shaped cavity extending from the top side of the capsule to a bottom side of the capsule. The top side of the capsule typically corresponds to the side of the capsule that points upward during the production of a beverage in a beverage system. On the other hand, the bottom side of the capsule typically points downward during the production of a beverage in a beverage system. Consequently, during the production of the beverage, the ingredients of a chamber of the capsule can be conveyed (if appropriate solely) by the force of gravity to the bottom side of the capsule and thus out of the capsule.

The chamber wall borders the first chamber and, if appropriate, the second chamber. In particular, the chamber wall, in a first sub-region, can form a wall of the first chamber and, if appropriate, in a second sub-region, can form a wall of the second chamber. The chamber wall can be designed, for example, as a pipe that extends from the top side of the capsule to the bottom side of the capsule. The channel-shaped cavity can in this case be arranged inside the pipe formed by the chamber wall. The pipe and/or the channel-shaped cavity preferably have a substantially round cross section. Furthermore, the pipe formed by the chamber wall preferably extends substantially centrally through the capsule.

A channel-shaped cavity extending through the capsule can thus be made available, through which liquids from a beverage system and/or the ingredients from the one or more chambers of the capsule can be conveyed into a beverage. In a starting state of the capsule, the channel-shaped cavity can be closed at the top side and/or at the bottom side of the capsule with a sealing foil (e.g. as part of the lid of the chamber). The channel-shaped cavity can thus be protected against contamination.

The capsule further comprises a valve element, with which a first outlet opening of the first chamber, and if appropriate a second outlet opening of the second chamber, can be opened at the chamber wall by means of a rod (in particular by means of a lancet) inserted into the cavity from the top side of the capsule, such that the ingredients can flow out of the capsule from the chambers via the cavity at the bottom side of the capsule.

A capsule is thus described having a (central) channel-shaped cavity, which can be used efficiently as an outlet channel of the capsule. The valve element of the capsule makes it possible to open the one or more outlet openings of the capsule, without contact occurring between the ingredients of the capsule and a beverage system. In particular, the one or more outlet openings can be opened by a rod of a beverage system, without the rod coming into contact with the ingredients of the capsule. It is thus possible to reliably prevent a beverage system from being contaminated by the ingredients of a capsule.

The chamber wall can form the valve housing of a valve of the capsule, wherein the first outlet opening and if appropriate the second outlet opening can be formed as apertures in the valve housing. The valve element can then form a closure part of the valve of the capsule. The closure part can comprise a (cylindrical and/or conical) closure part wall, which encloses the channel-shaped cavity. Furthermore, the closure part can have in the closure part wall one or more apertures, which can be aligned with the one or more outlet openings by a movement of the closure part relative to the valve housing, in order to open the one or more outlet openings. A capsule with a valve can thus be made available. By a movement of the closure part of the valve, the capsule can be efficiently and reliably opened and closed again (in particular without contact occurring between the ingredients of the capsule and a beverage system).

The one or more apertures in the closure part wall can be arranged in such a way that the one or more apertures in the closure part wall can be aligned with the one or more outlet openings by a translation movement of the closure part toward the bottom side of the capsule, in order to open the one or more outlet openings. Alternatively or in addition, the one or more apertures in the closure part wall can be arranged in such a way that the one or more apertures in the closure part wall can be removed from the one or more outlet openings by a translation movement of the closure part toward the top side of the capsule, in order to close the one or more outlet openings. Alternatively or in addition, the one or more apertures in the closure part wall can be arranged in such a way that the one or more apertures in the closure part wall can be aligned with the one or more outlet openings by a rotation movement of the closure part, in order to open the one or more outlet openings, and/or can be removed from the one or more outlet openings by a rotation movement of the closure part, in order to close the one or more outlet openings. A translation and/or rotation valve can thus be made available in order to open the capsule, and if appropriate close it again, in an efficient and reliable manner.

The valve of the capsule, being formed by the valve housing and the closure part, can be designed in such a way that, by a movement of the closure part, a degree of opening of the first outlet opening can be changed, in order to change a volumetric flow of the first ingredient from the first chamber into the channel-shaped cavity. Alternatively or in addition, the first outlet opening and the second outlet opening can have different shapes and/or geometries, such that a ratio of the volumetric flows of the first ingredient and of the second ingredient from the respective chamber into the channel-shaped cavity can be changed by a movement of the closure part. The capsule can thus be designed to flexibly adapt the volumetric flow of the ingredients of the capsule. The quality of a beverage that is produced can thus be enhanced.

The one or more outlet openings can be arranged in a lower region of the valve housing, wherein the lower region faces toward the bottom side of the capsule. The valve housing, in an upper region facing toward the top side of the capsule, can additionally have a first inlet opening to the first chamber, said first inlet opening being designed as an aperture through the valve housing. The first inlet opening can be used to convey a flushing medium (e.g. a gas and/or a liquid) into the first chamber, in order to convey the first ingredients out of the first chamber with the aid of the flushing medium. The removal of the ingredients from the one or more chambers of a capsule can be improved in this way.

The closure part can have an aperture in the closure part wall, which aperture can be aligned with the first inlet opening by a movement of the closure part relative to the valve housing, in order to open the first inlet opening. The valve of the capsule, being formed by the valve housing and the closure part, can be designed in such a way that, by a movement of the closure part, the one or more outlet openings and the first inlet opening can be closed together or can be opened together. Removal of ingredients from the capsule can be thus permitted in a reliable manner.

The closure part can comprise contact means by which a rod (of a beverage system) inserted from the top side of the capsule is allowed to act on the closure part in order to move the closure part, in particular in order to press the closure part toward the bottom side of the capsule, to pull it toward the top side of the capsule and/or to rotate it relative to the valve housing. By the provision of a contact means on the closure part, a reliable movement of the closure part for opening and/or closing a capsule can be permitted. Furthermore, a degree of opening of the one or more outlet openings can thus if appropriate be modified in a precise manner.

The contact means can comprise a rib which is arranged on an inner side of the closure part wall and which is designed in such a way that a shoulder of a rod (of a beverage system) can act on the rib in order to move the closure part, in particular in order to press the closure part toward the bottom side of the capsule. Efficient and reliable opening of a capsule can thus be permitted.

The rib extending along the inner side of the closure part wall can have one or more gaps. The rib, with the one or more gaps, can be designed in such a way that one or more wings of a rod (of a beverage system) can be guided through the one or more gaps, when the rod is moved in a first rotation position from the top side of the capsule into the cavity. The rib, with the one or more gaps, can furthermore be designed in such a way that the one or more wings can act on the rib of the closure part in order to pull the closure part toward the top side of the capsule when the rod is moved in a second rotation position toward the top side of the capsule. By the provision of a rib with one or more gaps, efficient and reliable closing of a capsule can be permitted.

The valve of the capsule, being formed by the valve housing and the closure part, can comprise one or more sealing elements (in particular sealing rings) which are designed to seal off an interspace between the valve housing and the closure part, both when the one or more outlet openings are closed and when the one or more outlet openings are opened. In this case, the interspace can be sealed off in particular in such a way that substantially no ingredients can pass from the one or more chambers into the interspace. Contamination of a beverage system by the ingredients of a capsule can thus be reliably avoided.

As has already been explained above, the closure part can be designed to reclose the one or more outlet openings after the latter have been opened. By the closure of a capsule following production of a beverage, contamination of a beverage system by the ingredients of a capsule can be reliably avoided.

The closure part of the valve can be made at least partially of another material than the valve housing. For example, the closure part can be made of PET and the valve housing of PE (or vice versa). Reliable opening and/or closing of the valve can thus be ensured even after a prolonged storage of a capsule.

As an alternative or in addition to the function of the valve housing of a valve, the chamber wall can comprise a first flap for the first chamber. Furthermore, the chamber wall can have one or more further flaps for one or more further chambers. Furthermore, the valve element can comprise or provide a first predetermined break point, wherein the predetermined break point is configured to be broken by a rod inserted from the top side of the capsule into the cavity, in order to open the first flap and thus the first outlet opening. For example, a rib can be arranged as valve element on the chamber wall. The rib on the chamber wall can make it possible to apply an external force to the first flap by means of a rod. The first flap can be torn open or broken off by this force. The first flap can in this case be opened in such a way that the first flap cannot be completely closed again. On the other hand, the first flap can be configured (e.g. by the choice of a suitable elastic material) in such a way that the first flap at least partially closes the first outlet opening again, when there is no longer an external force acting on the first flap. A cost-effective "valve mechanism" for a beverage capsule can thus be made available.

The capsule can comprise, on the bottom side of the capsule, a nozzle which is configured to bundle and/or focus a stream of liquid from the channel-shaped cavity. The quality of a beverage that is produced can thus be further enhanced, and the danger of contamination of a beverage system can thus be further reduced.

The first chamber can have a greater holding capacity than the second chamber. Alternatively or in addition, the base of the first chamber can reach closer to the bottom side of the capsule than does the base of the second chamber.

The capsule body can be asymmetric, in particular asymmetric with respect to a rotation about a rotation axis extending along the channel-shaped cavity, in such a way that the capsule permits a unique orientation of the capsule, in particular with respect to a rotation about the rotation axis. It is thus possible to ensure that the capsule can be inserted into a capsule holder of a beverage system in a unique position. In this way, errors in the operation of a beverage system can be reduced.

As has already been explained above, the channel-shaped cavity can be enclosed directly by a wall. In particular, the channel-shaped cavity of a capsule can be formed by the closure part wall of a closure part of a valve of a capsule. The wall of the channel-shaped cavity can have, on an inner side, a profile (in particular a spiral-shaped profile) which is designed in such a way that a liquid jet flowing from the top side of the capsule to the bottom side of the capsule is subjected to a rotary impulse by the profile. The profile can in particular be designed in such a way that a Coriolis force acting on the liquid flowing through the channel-shaped cavity is intensified by the profile. If appropriate, the liquid can be pumped (at a defined pressure) from the top side of the capsule into the channel-shaped cavity by a pump. The profile can be formed by indentations and/or elevations on the inner side of the wall of the channel-shaped cavity. By the provision of a profile, the liquid jet emerging at the bottom side of the capsule can be bundled. The quality of the beverages that are produced can thus be enhanced. Furthermore, contamination of a beverage system can thus be avoided.

The (auxiliary) liquid flowing through the channel-shaped cavity can contain carbon dioxide and/or be carbonated. In particular, a carbonated liquid can be introduced into the channel-shaped cavity through a beverage system (in particular through a hollow rod of a beverage system). The (auxiliary) liquid can, for example, comprise water and/or alcohol. On account of temperature changes of the liquid in the capsule and/or in the beverage system, it is possible for gas, in particular carbon dioxide, to escape from the liquid if appropriate. The channel-shaped cavity can be designed in such a way that a cross section of the channel-shaped cavity widens toward the bottom side of the capsule. A pressure relief of the liquid in the channel-shaped cavity can thus be achieved. Furthermore, an escape of free gas from a jet of liquid can thus be supported. Alternatively or in addition, a lower edge of the wall (in particular of the closure part wall) directly enclosing the channel-shaped cavity, said lower edge being directed toward the bottom side of the capsule, can comprise one or more cutouts via which gas can escape from the channel-shaped cavity. The channel-shaped cavity can thus be designed in such a way that gas emerging from a liquid in the channel-shaped cavity can be reliably discharged from the channel-shaped cavity. The reliability of the production of a (carbonated) beverage and/or the quality of a beverage produced can thus be enhanced. Furthermore, contamination of a beverage system can thus be reliably avoided.

The second outlet opening of the second chamber can be arranged nearer the top side of the capsule than the first outlet opening of the first chamber. In particular the outlet openings can be arranged in such a way that, initially, second ingredients emerging from the second chamber, and thereafter first ingredients emerging from the first chamber, mix with an (auxiliary) liquid flowing from the top side to the bottom side of the capsule through the channel-shaped cavity. The second ingredients in this case can have a higher solubility, in the liquid flowing through the channel-shaped cavity, than the first ingredients. By the sequential delivery of different ingredients to the liquid flowing through the channel-shaped cavity, the quality of a mixed beverage that is produced can be enhanced, in particular if initially ingredients with a relatively high solubility, and only thereafter ingredients with a relatively low solubility, are mixed with the liquid flowing through the channel-shaped cavity.

According to one aspect of the invention, a beverage system for producing a beverage, in particular a mixed beverage, on the basis of ingredients in a capsule is described. The beverage system can in particular process a capsule comprising the ingredients for precisely one portion (e.g. for one glass) of an (alcoholic or non-alcoholic) beverage. From the ingredients (in particular from substantially all the ingredients) of one capsule, a portion of a beverage can be produced by the beverage system.

The beverage system typically comprises a housing, which at least partially encloses an interior of the beverage system. For example, the housing can be cuboid with four side walls, a base and a top wall. The beverage system can be designed, for example, as a domestic appliance, in particular as a household appliance which, for example, can be placed on a work surface of a kitchen and/or can be installed in a cabinet.

The beverage system can be configured to receive a capsule described in this document. The beverage system comprises a capsule support for holding a capsule. The beverage system furthermore comprises a dispensing unit for making available a beverage produced on the basis of the ingredients in the capsule. The beverage system additionally comprises an opening means which is configured to open the one or more outlet openings of the capsule held by the capsule support, such that ingredients at the bottom side of the capsule can flow from the channel-shaped cavity of the capsule to the dispensing unit. The capsule and in particular the channel-shaped cavity can in this case be arranged directly above the dispensing unit, such that the ingredients from the capsule and/or liquids from the beverage system can flow directly from the channel-shaped cavity to the dispensing unit (e.g. into a beaker at the dispensing unit).

The opening means can comprise a rod which is configured to be guided or moved from the top side of the capsule, held by the capsule support, into the cavity of the capsule, in order to open and/or reclose the one or more outlet openings of the capsule. The rod can in this case be designed as a hollow rod with a liquid channel. The beverage system can then be configured to make available a liquid (e.g. water and/or alcohol) for the beverage at a top side of the liquid channel, such that the liquid flows through the liquid channel to the channel-shaped cavity of the capsule and from there to the dispensing unit. By the use of a hollow rod, a beverage can efficiently and reliably be made available that is bundled via the channel-shaped cavity of the capsule. It is thus possible to ensure good mixing of the liquid and of the capsule ingredients in order to produce a high-quality beverage.

The rod can comprise a shoulder which extends at least partially around the rod and which is configured to press on a rib of a closure part of the capsule, in order to move the closure part in the direction of the bottom side of the capsule and in order thereby to open the one or more outlet openings of the capsule.

The shoulder can be designed to close off the channel-shaped cavity in a fluid-tight manner above the rib of the closure part, such that a sealed cavity is obtained above the shoulder. The beverage system can then be configured to convey a flushing medium (e.g. a gas and/or a liquid) into the first chamber via the sealed cavity and via a first inlet opening of the first chamber of the capsule. In this way, the ingredients of the first chamber of a capsule can be conveyed completely and rapidly out of the capsule.

The rod can comprise, on a side of the shoulder facing toward the capsule, one or more wings which are designed in such a way that, in a first rotation position of the rod, they can be guided through one or more corresponding gaps of the rib of the closure part and, in a second rotation position, can act on the rib during a movement of the rod toward the top side of the capsule, in order to pull the closure part toward the top side of the capsule. A rotation of the rod (e.g. a rotation of between more than 0° and 90°) can take place between the first rotation position and the second rotation position.

The beverage system, in the context of the production of a beverage, can thus be configured to move the rod in the first rotation position in the direction of the bottom side of the capsule in order, by means of the shoulder, to press the closure part in the direction of the bottom side of the capsule, in order thereby to open the one or more outlet openings of the capsule. The ingredients can then be transferred from the capsule into the beverage. Furthermore, the beverage system, in the context of the production of a beverage, can be configured to move the rod in the second rotation position in the direction of the top side of the capsule in order, by means of the one or more wings, to pull the closure part in the direction of the top side of the capsule, in order thereby to close the one or more outlet openings of the capsule. By the closure of the capsule following the production of a beverage, contamination of the beverage system can be reliably avoided.

The rod can comprise, at a side facing toward the capsule, a needle which is configured to pierce a lid and/or a sealing foil covering the channel-shaped cavity. The rod can thus be designed as a lancet.

It will be noted that any aspects of the system described in this document and of the capsule described in this document may be combined with one another in a variety of ways. In particular, the features of the claims may be combined with one another in a variety of ways.

BRIEF DESCRIPTION OF THE SEVERAL VIEWS OF THE DRAWING

The invention is described in more detail below on the basis of illustrative embodiments depicted in the accompanying drawing, in which:

FIG. 1c shows a valve of the capsule from FIG. 1a;

FIG. 1d shows a plan view of the capsule from FIG. 1a;

FIG. 1e shows a perspective view of the capsule from FIG. 1a;

FIG. 2d shows a sectional view of a closure part of a valve of the capsule from FIG. 1a;

FIG. 3a shows an example of an outlet opening of a main chamber of the capsule from FIG. 1a;

FIG. 3b shows an example of an outlet opening of a secondary chamber of the capsule from FIG. 1a;

DESCRIPTION OF THE INVENTION

As was explained at the outset, the present document concerns the reliable production of a beverage on the basis of the ingredients in a capsule.

Figure 1A:
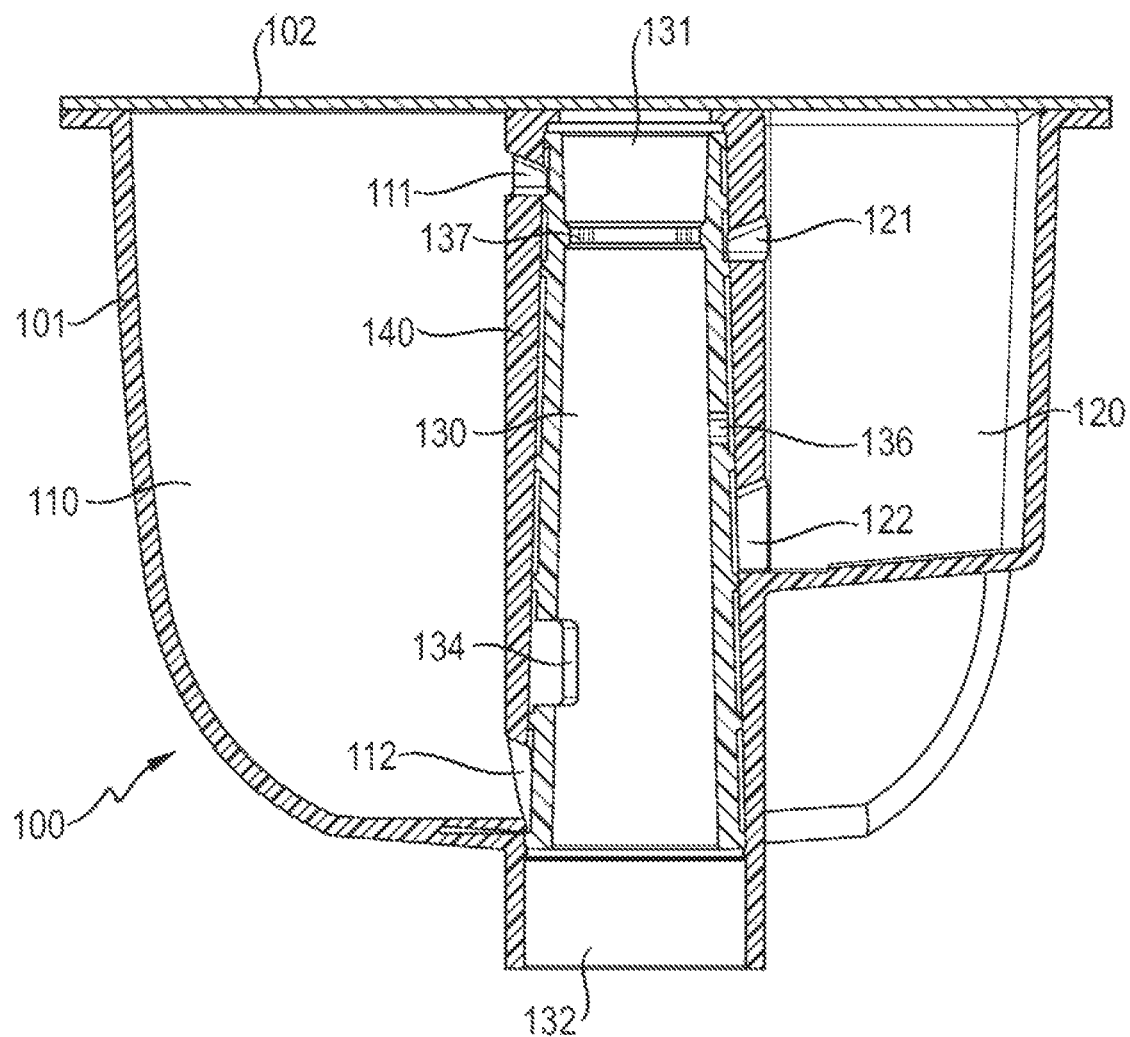
FIG. 1a shows a sectional view through a capsule with a valve in a closed state.

In this connection, FIG. 1a shows an example of a capsule, in particular an example of a multi-chamber capsule 100. The capsule 100 shown in FIG. 1a comprises two chambers 110, 120, wherein the chambers 110, 120 are formed by separate shells or vessels. The chambers 110, 120 can be used to store different ingredients separately from each other. By providing a plurality of chambers 110, 120 for different ingredients, the storage life of the ingredients in a capsule 100 can be increased.

The capsule 100 can be used in a beverage system or in an automatic beverage dispenser for producing mixed beverages. Alcoholic and/or non-alcoholic beverages can be produced. A portion of a beverage can be produced by the ingredients (e.g. liquids) stored inside a capsule 100 being brought together with a stream of liquid provided by the beverage system. Here, contamination of the beverage system by ingredients from a capsule 100 is to be avoided as far as possible, in order to be able to use the beverage system in an efficient and convenient manner for producing a large number of portions, possibly of different beverage types.

The capsule 100 shown in FIG. 1a comprises a capsule body 101, by which the one or more chambers 110, 120 of the capsule 100 are formed. The capsule body 101 can be covered by a lid 102, wherein the lid 102 can be formed by a sealing foil. Furthermore, the capsule 100 comprises a valve 130, 140, wherein the valve 130, 140 comprises a valve housing 140 (generally also designated as chamber wall) in which a closure part 130 is arranged. The valve housing 140 can be part of the capsule body 101 and can at least partially form the one or more chambers 110, 120. In particular, the valve housing 140 can form at least one respective wall of the one or more chambers 110, 120. The closure part 130 can be moved inside the valve housing 140, in order to open and close the valve 130, 140.

In the example shown in FIG. 1, the valve housing 140 encloses a (circular) cylindrical space in which the closure part 130 can be moved in translation in order to open and close the valve 130, 140. In particular, the valve 130, 140 can be opened when the closure part 130 is moved downward, and it can be closed when the closure part 130 is moved upward.

In an upper region, or near a top side of the capsule 100, the valve housing 140 has a first inlet opening 111 for the first chamber 110 and a second inlet opening 121 for the second chamber 120. An inlet opening 111, 112 can be used to deliver a flushing medium to a chamber 110, 120 in order to flush the ingredients out of the chamber 110, 120. Alternatively or in addition, an inlet opening 112, 112 can be used to aerate a chamber 110, 120, in order to allow the ingredients to flow out of a chamber 110, 120 (if appropriate solely by force of gravity).

Furthermore, in a lower region, or near a bottom side of the capsule 100, the valve housing 140 has a first outlet opening 112 for the first chamber 110 and a second outlet opening 122 for the second chamber 120. By way of an outlet opening 112, 112, the ingredients of a chamber 110, 120 can flow out of the chamber 110, 120.

The closure part 130 can be designed to close the openings 111, 112, 121, 122 of the one or more chambers 110, 120 in a closed state of the valve 130, 140. On the other hand, the openings 111, 112, 121, 122 can be opened by a movement of the closure part 130, such that the ingredients can flow out of the one or more chambers 110, 120 (if appropriate using a flushing medium that can be delivered to the one or more chambers 110, 120 via the one or more inlet openings 112, 112). For this purpose, the closure part 130 can have a first aperture 134 for opening the first chamber 110 and, if appropriate, a second aperture 136 for opening the second chamber 120. The one or more apertures 134, 136 (of the closure part wall) of the closure part 130 can be brought in front of the outlet openings 112, 122 of the valve housing 140 by a movement of the closure part 130, such that one or more outlet channels are created from the one or more chambers 110, 120 through the outlet openings 112, 122 and apertures 134, 136 into a channel-shaped cavity of the closure part 130.

The closure part 130 can have a (cylindrical or channel-shaped) cavity which extends from an upper end 131 of the closure part 130 to a lower end 132 of the closure part 130. The cavity is enclosed by the closure part wall of the closure part 130, wherein the apertures 134, 136 are formed by apertures in the closure part wall of the closure part 130. The cavity of the closure part 130 can be positioned, inside a beverage system, above a container for a beverage, in such a way that the ingredients flowing out of a chamber 110, 120 can flow directly out of the channel-shaped cavity into the container without coming into contact with a component of the beverage system. Contamination of a beverage system can thus be efficiently and reliably avoided.

Figure 1B:
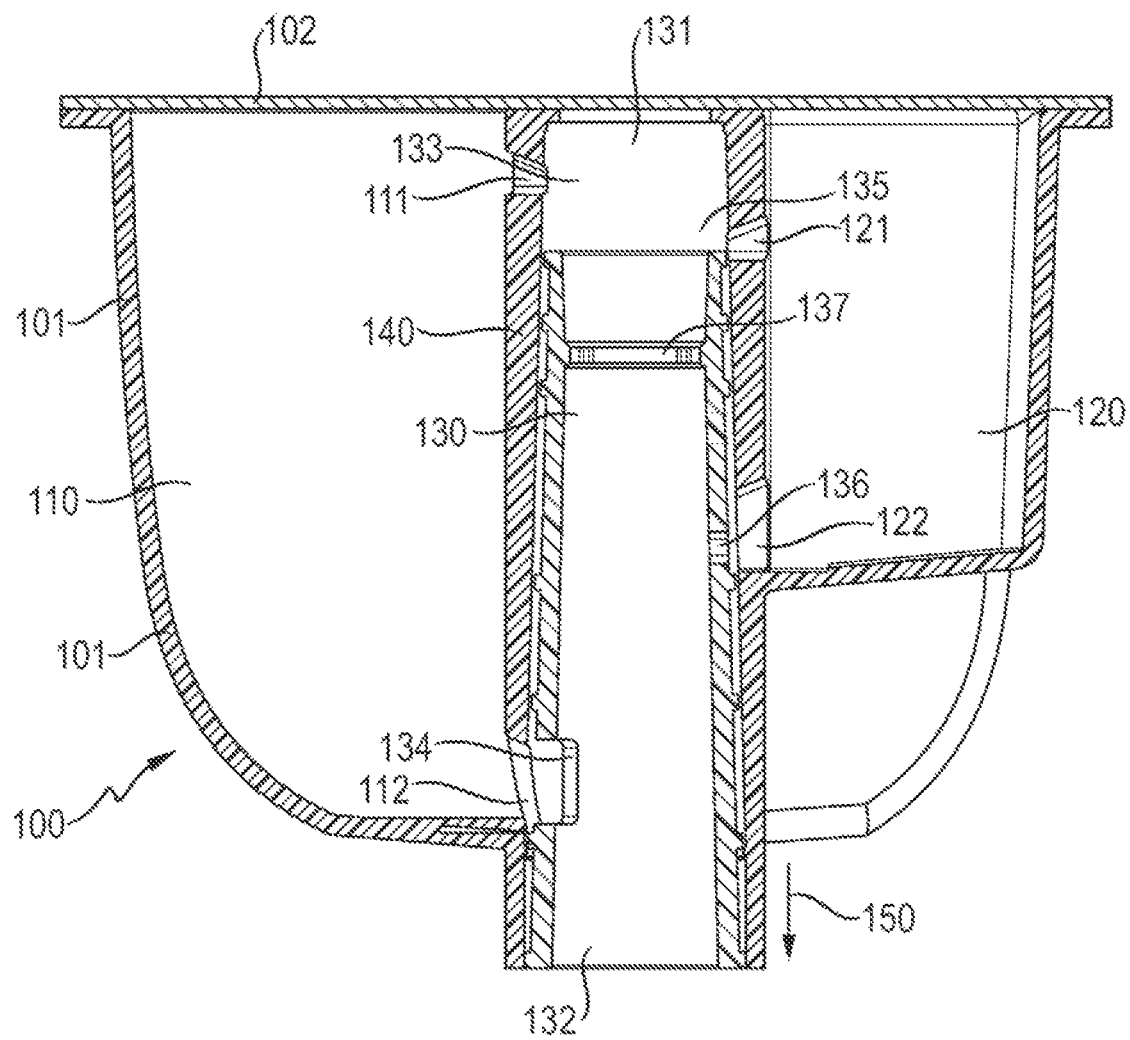
FIG. 1b shows a sectional view of the capsule from FIG. 1a with a valve in an opened state.

FIG. 1b shows the capsule 100 from FIG. 1a in an opened state. In particular, FIG. 1b shows how, by a movement 150 of the closure part 130, an aperture 134, 136 of the closure part 130 can be moved in front of an outlet opening 112, 122 of a chamber 110, 120. FIG. 1b furthermore shows how a passage 133, 135 of the closure part 130 can also be moved in front of an inlet opening 111, 121 of a chamber 110, 120. This has the effect that the ingredients can flow out of the capsule 100 from one or more chambers 110, 120 via the channel-shaped cavity of the closure part 130. If appropriate, a flushing medium can be guided into the chamber 110, 120 via an aperture 133, 135 of the closure part 130 and via an inlet opening 111, 121 of a chamber 110, 120, in order to flush the ingredients out of the chamber 110, 120.

Figure 1C:
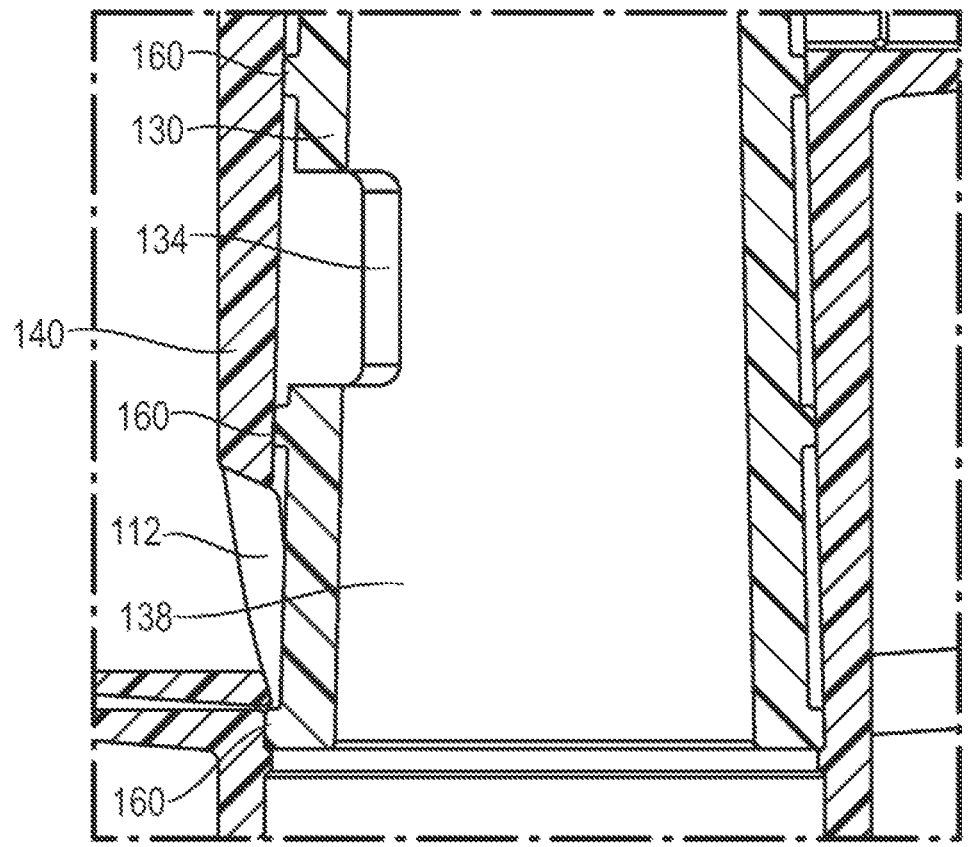

FIG. 1c shows a detail of the closure part 130 and of the valve housing 140. In particular, FIG. 1c shows an aperture 134 of the closure part 130 and an outlet opening 112 of the valve housing 140 or of a chamber 110. By means of a translation movement 150, the aperture 134 and the outlet opening 112 can be positioned in front of each other (i.e. aligned) in such a way that an outlet channel is created from the chamber 110 as far as the channel-shaped cavity 138 of the closure part 130. The closure part 130 can have one or more sealing elements 160, which are arranged between the closure part 130 and the valve housing 140, in order to avoid escape of the ingredients from a chamber 110 via an interspace between the outer side of the closure part 130 and the inner side of the valve housing 140.

Figure 1D:
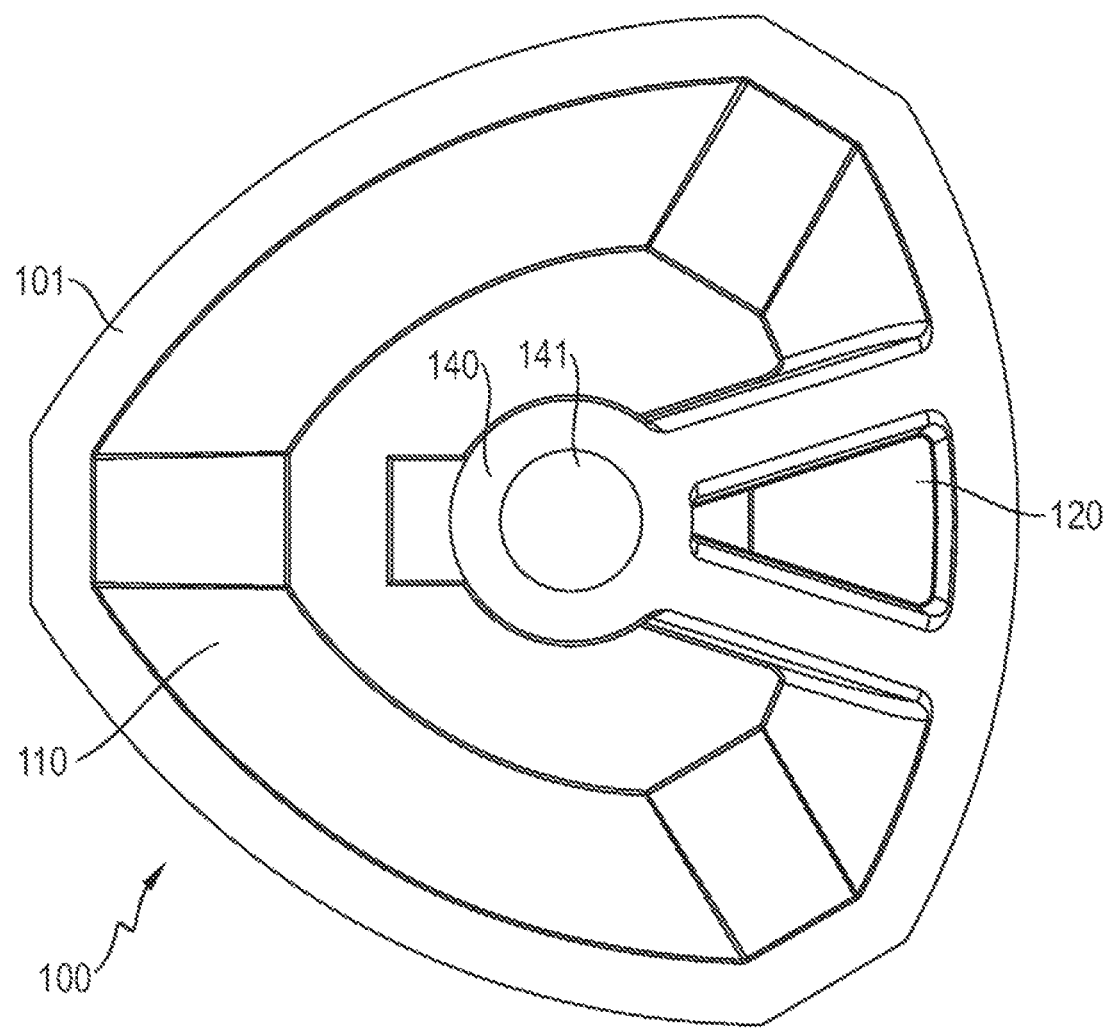

FIG. 1d shows a plan view (from above) of a capsule 100. FIG. 1d shows in particular the chambers 110, 120 for holding (different) ingredients. In the example shown in FIG. 1d, the first chamber 110 is designed as a (relatively large) main chamber, and the second chamber 120 is designed as a (relatively small) secondary chamber. It will be seen from FIG. 1d that the valve housing 140 forms in each case a wall of the one or more chambers 110, 120. The valve housing 140 encloses a (cylindrical) cavity 141, in which the closure part 130 can be placed and moved up and down in a translation movement 150.

Figure 1E:
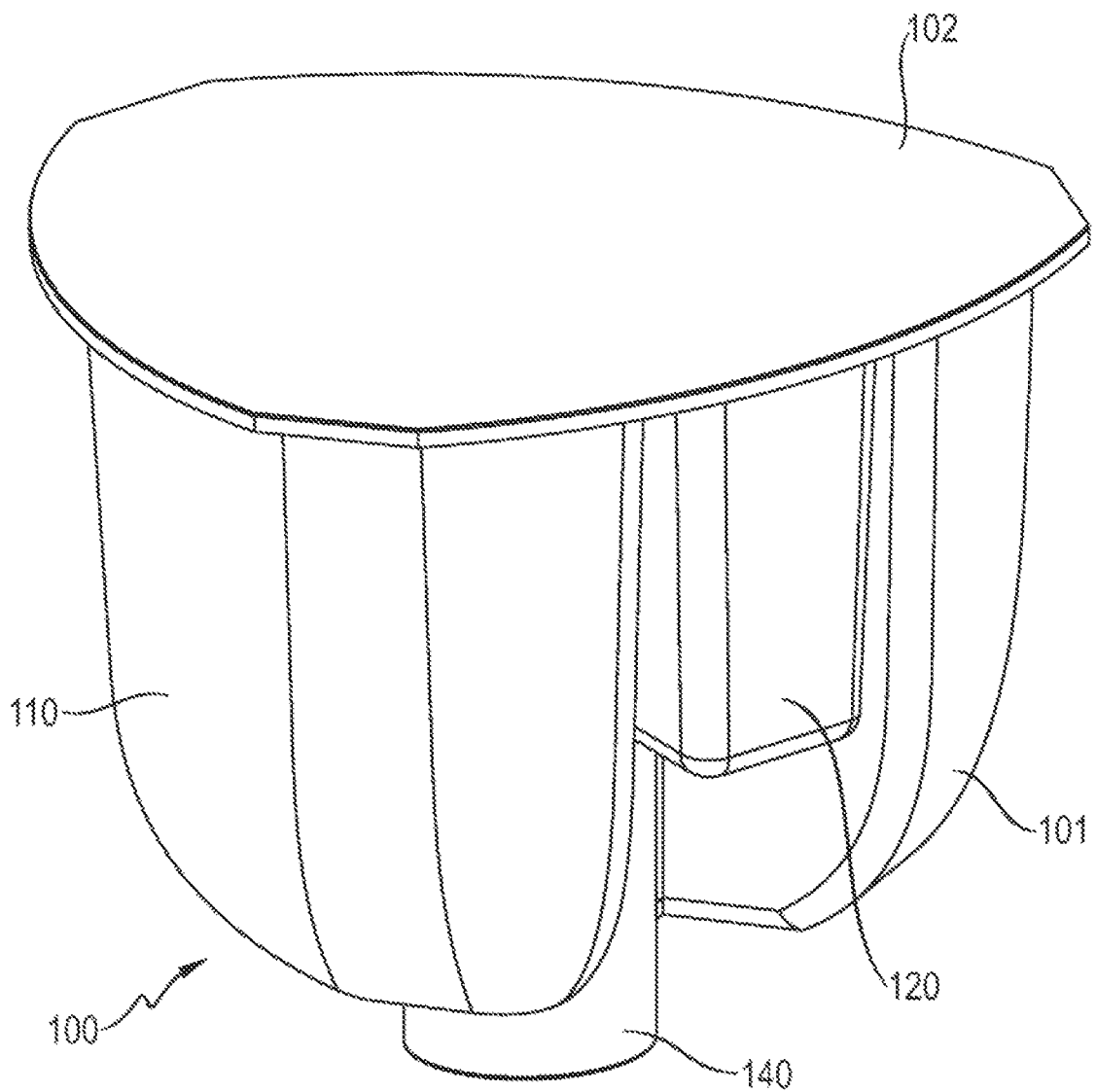

FIG. 1e shows an example of a capsule 100 in a perspective view. As will be seen from FIG. 1e, the capsule 100 preferably has a non-rotationally symmetrical shape. In particular, the capsule 100 can have a shape which interacts with a recess of a capsule-receiving unit of a beverage system in such a way that the capsule 100 can be placed in the capsule-receiving unit only in a defined manner. It is thus possible to increase the reliability of the production of a portion of a beverage.

The capsule 100 described in this document can thus consist of at least three components, in particular a sealing foil 102, a valve 130, 140, and a capsule body 101. Furthermore, a nozzle can be used at the outlet end 132 of the valve 130, 140 in order to improve the quality of a jet of liquid from the capsule 100. In particular, a nozzle can be pressed into a lower region 132 of the valve 130, 140 in order to improve the outlet geometry.

If appropriate, a further sealing foil (not shown) can be used at the lower region 132 of the valve 130, 140 and seals the lower region 132 of the valve 130, 140 (i.e. the outlet of the capsule 100). This optional foil can be removed by a user or can be cut open by means of the valve 130, 140, in particular by means of the movable closure part 130 of the valve 130, 140.

As is shown in the figures, the capsule 100 can have at least two chambers 110, 120 separate from each other, in which case a large part of the capsule volume can be formed by a first chamber 110 which can be filled with a first ingredient (in particular with a first liquid). At least one second chamber 120 can be smaller than the first chamber (i.e. the main chamber) 110 and can be filled with a second ingredient (in particular a second liquid). The ingredients (in particular the liquids) can comprise a fruit syrup, beverage concentrates, and/or other substances that can be used to prepare beverages, e.g. alcoholic liquids with up to 100% alcohol.

The capsule 100 can be sealed with a sealing foil 102. For example, a PET foil 102 can be applied by heat sealing or by an ultrasonic welding method. The capsule body 102 and/or the valve 130, 140 can be made of plastic. At least partially different materials can be used here. Examples of materials are PET, PE, PP or PBT. In particular, the closure part 130 and the valve housing 140 can comprise different materials. It is thus possible to reliably and efficiently avoid bonding and/or welding of the closure part 130 and the valve housing 140. In particular, it is thus possible to avoid a stick-slip effect between different components of a capsule 100.

A capsule 100 can be sealed via one or more sealing lips or sealing elements 160 at the translation valve 130, 140. The sealing lips 160 radially surrounding the closure part 130 can divide the valve 130, 140 into several portions in the axial direction. The portions separated from one another can bring about the closed state and open state of the apertures and openings 111, 121, 112, 122 of the valve housing 140 and of the chambers 110, 120.

As has already been explained above, pressing the closure part 130 of the valve 130, 140 down (in the direction 150) can have the effect that the apertures 133, 135, 134, 136 of the closure part 130 align with the openings 111, 112, 121, 122 of the valve housing 140 and of the chambers 110, 120, such that inlet and/or outlet channels are formed. The capsule 100 is then situated in an opened state.

Through the inlet openings 111, 112 situated higher up, a flushing medium (e.g. compressed air or gas) can be conveyed, if appropriate from a gas cylinder, into the chambers 110, 120 of the capsule. In this way, the ingredients (in particular liquids) situated in the chambers are driven out. Alternatively or in addition, a liquid can also be driven as flushing medium through the chambers 110, 120, in order to generate and flush out an ingredients mixture with the ingredients of the chambers 110, 120.

The liquid flowing out through the outlet openings 112, 122 can mix with an additional stream of liquid inside a channel-shaped cavity 138 of the valve 130, 140. The stream of liquid can be conveyed into the channel-shaped cavity 138 of the valve 130, 140 through a lancet of a beverage system for opening the capsule 100.

The outlet openings 112, 122 of the different chambers 110, 120 can have a different height. In particular, the outlet opening 122 of the second chamber 120 can lie higher than the outlet opening 112 of the first chamber 110 (as is shown in FIG. 1a). It is thus possible to achieve a reliable mixing of the ingredients inside the channel-shaped cavity 138.

Figure 2A:
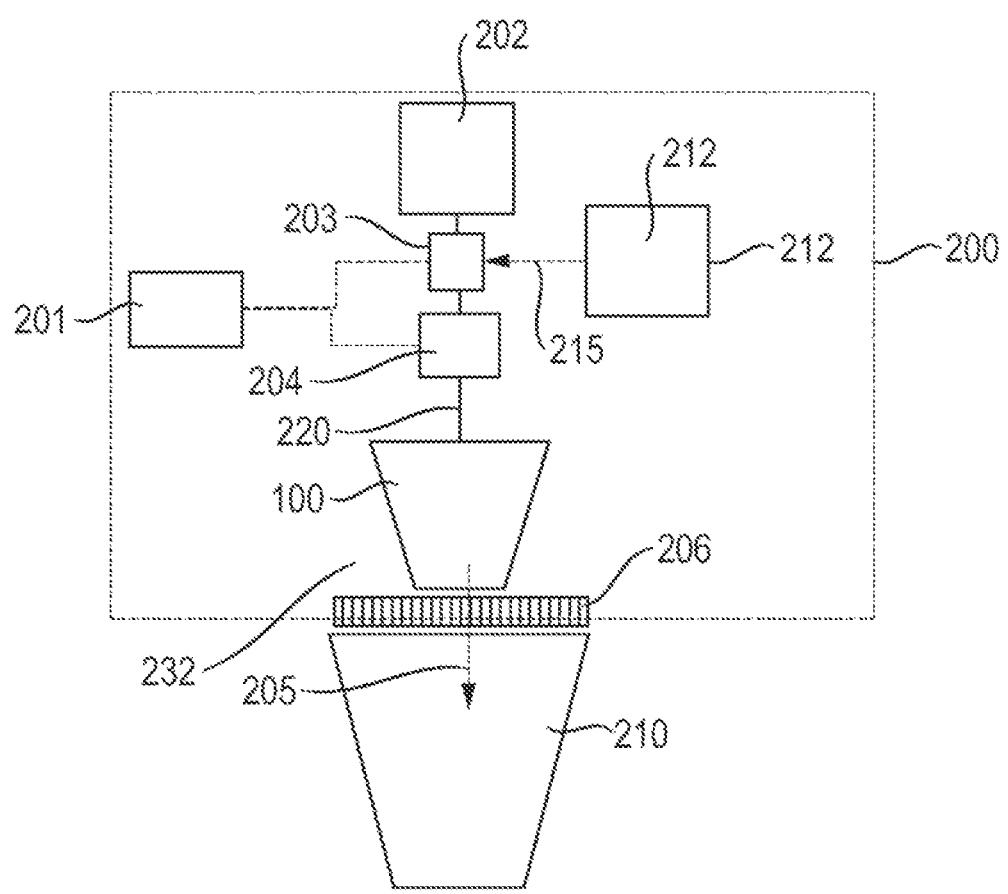
FIG. 2a shows a block diagram of an example of a beverage system.

FIG. 2a shows a block diagram of an example of a capsule and beverage system 200. The capsule system 200 comprises a control unit 201, which is configured to control the process of producing (a portion) of a beverage. A capsule 100 can be supplied by a user to the system 200 (into a capsule-receiving unit provided for this purpose in the system 200). The capsule can then be transferred if appropriate via optional conveying means (e.g. via a conveyor carriage) to a processing position 232 in the interior of a housing of the capsule system 200. The conveying means can be activated by the user (e.g. by actuation of a button or directly by insertion of the capsule 100). When the capsule 100 arrives at the processing position 232, the production process can be started.

In the context of the production process, the control unit 201 causes an opening means 220 for opening the capsule 100 (e.g. a (hollow) needle or lancet) to be guided to the capsule 100. For this purpose, an actuator 204 can be triggered which brings the opening means 220 to the capsule 100 in order to open the capsule 100. Moreover, a further actuator 203 can be triggered in order to force flushing medium (e.g. from a container 202 of the system 200) into the capsule 100, in order to flush at least one chamber 110, 120 in the capsule 100. By opening the capsule 100 and if appropriate by flushing one or more chambers 110, 120 of the capsule 100, the ingredients of the one or more chambers 110, 120 can flow out of the capsule 100. A beaker 210, in which the beverage to be produced is made available to the user, can be positioned below a dispensing unit 206 of the system 200. The system 200 can be designed in such a way that an ingredients mixture 205 (comprising the ingredients and if appropriate a flushing medium) flows from the one or more chambers 110, 120 of the capsule 100 directly into the beaker 210 via the dispensing unit 206.

The system 200 can also be configured to fill the beaker 210 with one or more further auxiliary liquids 215 (e.g. from a container 212) for the beverage that is to be produced. The auxiliary liquid 215 can, for example, comprise alcohol. The auxiliary liquid 215 can be transferred through the channel-shaped cavity 138 of the valve 130, 140 of a capsule 100 into the beaker 210. Reliable mixing of a beverage can thus be achieved.

By means of the capsule or beverage system 200 shown in FIG. 2a, a mixed beverage can be reliably produced without contaminating the capsule or beverage system 200.

Figure 2B:
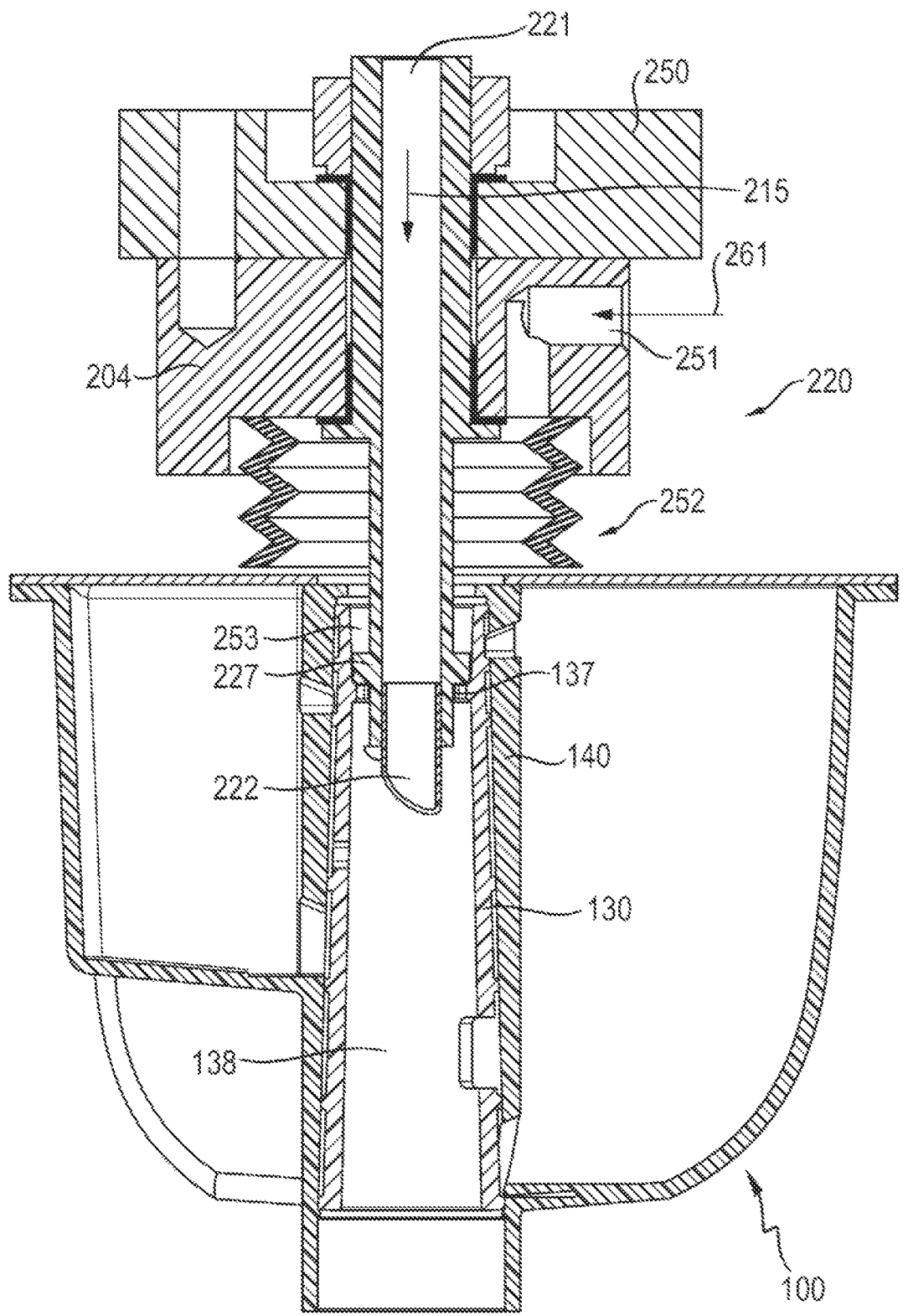
FIG. 2b shows an example of opening means of a beverage system.

FIG. 2b shows details relating to an example of an opening means 220 for opening a capsule 100. The opening means 220 comprises a rod 221, which can be hollow if appropriate. The rod 221 can be used to open a capsule 100 and in particular the valve 130, 140 of a capsule 100. In order to open the capsule 100, the rod 221 can be driven down by an actuator 204. The rod 221 can have a tip 222 at the lower end of the rod 221, in order to pierce the lid 102 of the capsule 100 in the region of the channel-shaped cavity 138 of the closure part 130 of the valve 130, 140 of the capsule 100. The rod 221 can thus be designed as a lancet.

At the inner wall facing toward the cavity 138, the closure part 130 can have an at least partially circumferential web or an at least partially circumferential rib 137. The rod 221 can have a diameter such that the rod 221 can be guided through the partially circumferential rib 137. However, in a defined region, the rod 221 can have an opening web or a shoulder 227 which presses onto the rib 137 of the closure part 130 when the rod 221 is driven down. The rod 221 can thus press the closure part 130 in the movement direction 150 and thereby transfer the valve 130, 140 to the opened state. Moreover, the cavity 138 can be sealed off by the rib 137 and by the shoulder 227 such that, above the shoulder 227, a sealed-off cavity 253 is formed between the rod 221 and the inner wall of the closure part 130.

The opening means 220 can comprise a housing 250 through which the rod 221 is guided. Furthermore, a seal 252 can be arranged on the housing 252 which seal off the housing 252 and the lid 102 of the capsule 100. In particular, a flushing channel 251 from the housing 252 to the capsule 100, in particular to the sealed-off cavity 253, can be formed through the seal 252. The flushing medium 261 can then be conveyed, in particular forced, through the flushing channel 251 into the sealed-off cavity 253 and from there through the inlet openings 111, 112 into the chambers 110, 120 of the capsule 100.

The rod 221 can be designed as a hollow rod or pipe. Thus, an auxiliary liquid 215 for a beverage that is to be produced can be guided efficiently through the hollow rod into a beaker 210 via the channel-shaped cavity 138 of the closure part 130 of the capsule 100.

Figure 2C:
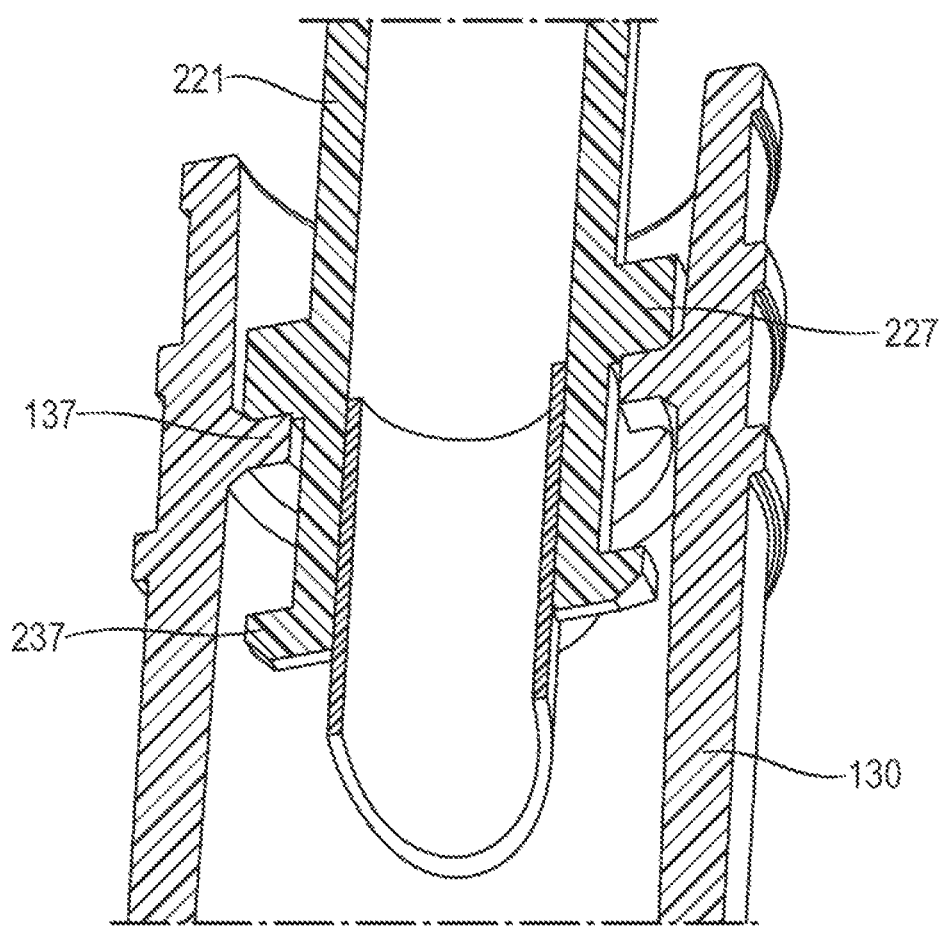
FIG. 2c shows a sectional view of an opening means and of a closure part of a valve.

FIG. 2c shows a section through a (hollow) rod 221 and through the closure part 130. FIG. 2c shows in particular how the rib 137 of the closure part 130 can serve as a support for the shoulder 227 of the rod 221, in order to move the closure part 130 from the closed position to the opened position.

It may be advantageous to reclose the valve 130, 140 of a capsule 100 after a beverage has been produced. It is thus possible in particular to avoid a situation where ingredients that remain in the one or more chambers 110, 120 of a capsule 100 run out and thus contaminate the beverage system 200. For this purpose, the rod 221 can have a closing web or one or more wings 237 that can act from below on the rib 137 of the closure part 130 in order to pull the closure part 130 upward into the closed position. A closing web 237 of this kind is shown in FIG. 2c. The closing web 237 can be designed, for example, as one or more wings locally limited on the rod 221.

Figure 2D:
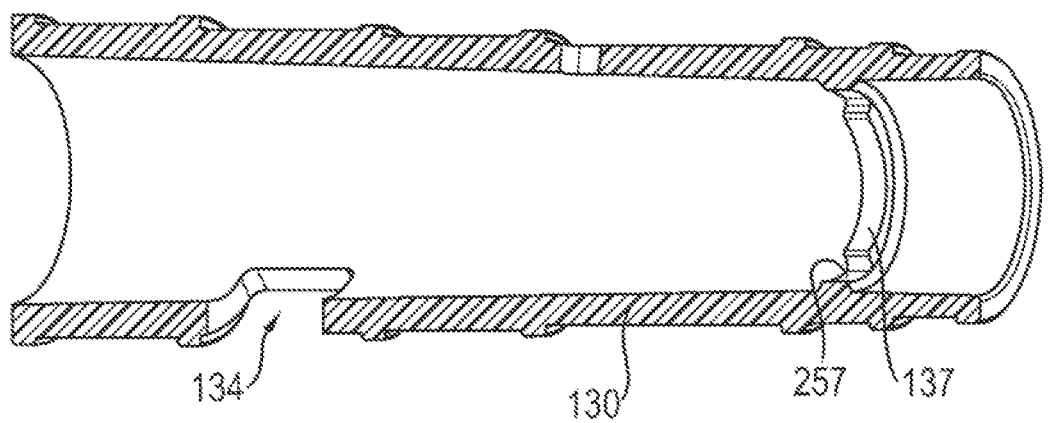

As is shown in FIG. 2d, the rib 137 of the closure part 130 can have one or more gaps 257, which are designed in such a way that the one or more wings 237 can pass the rib 137 when the rod 221 has a defined rotation angle (e.g. a first rotation position). On the other hand, a rotation of the rod 221 (e.g. to a second rotation position) can have the effect that the one or more wings 237 impact the rib 137 of the closure part 130 when the rod 221 is driven upward.

Figure 2E:
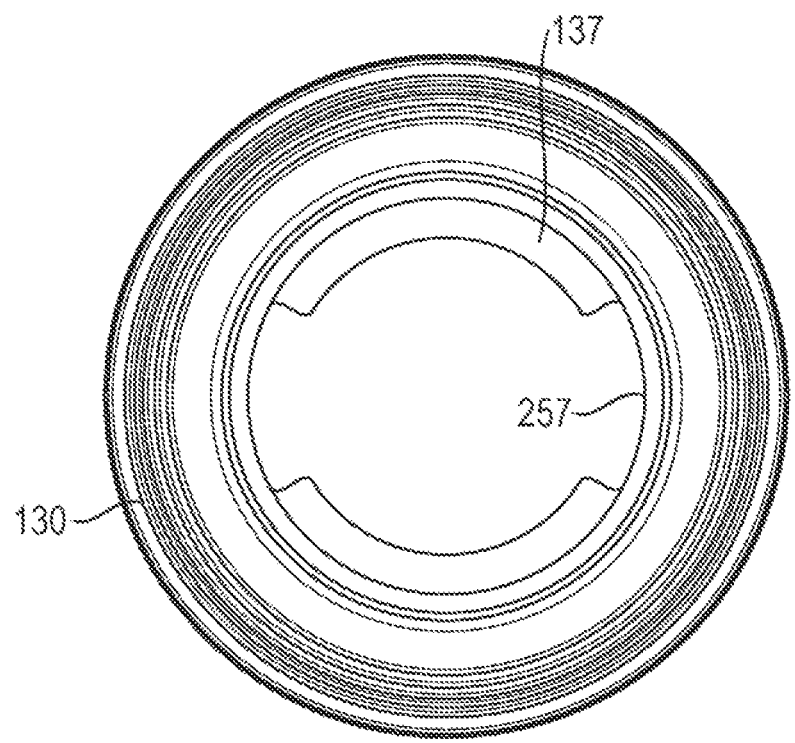
FIG. 2e shows an example of contact means of a closure part of a valve.
Figure 2F:
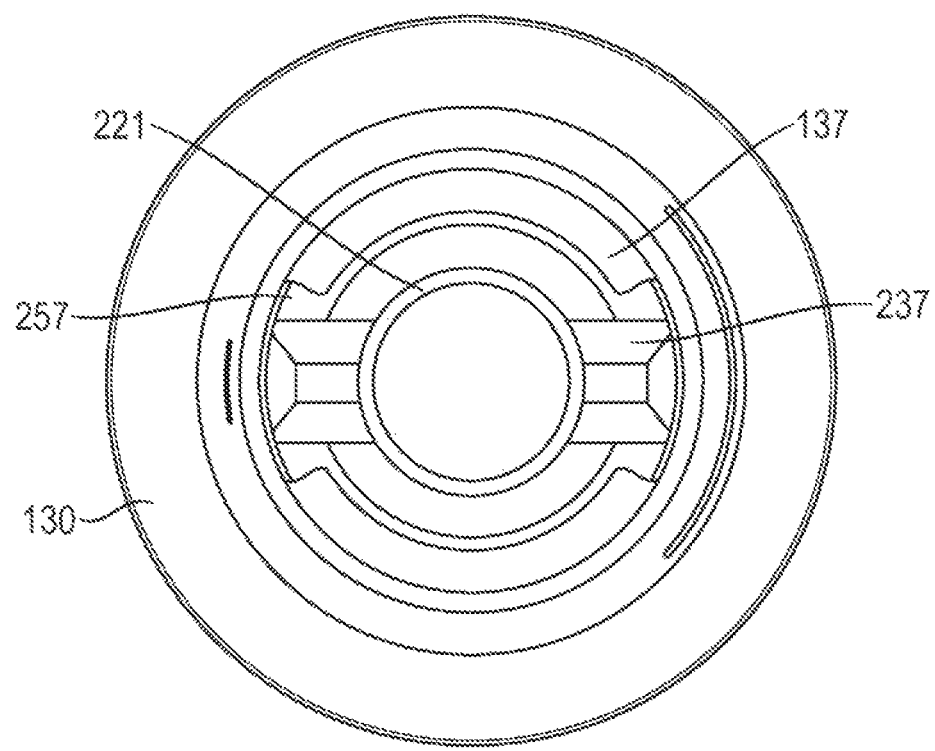
FIG. 2f shows the interaction of a closure element and of the contact means before a capsule is opened.
Figure 2G:
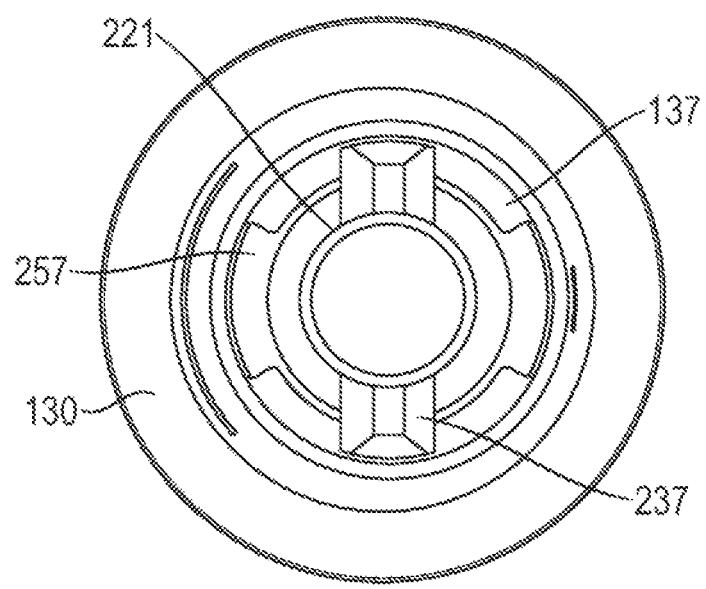
FIG. 2g shows the interaction of a closure element and of the contact means after a capsule has been opened.

FIG. 2e shows a plan view (from above) of the rib 137 of a closure part 130 with the gaps 257. FIG. 2e shows the rod 221 and the wings of the closing web 237 in a plan view (from above) when the rod 221 is driven downward in order to open the valve 130, 140 of a capsule 200. FIG. 2g on the other hand shows the rod 221 and the wings of the closing web 237 in a plan view (from below) when the rod 221 is driven upward in order to close the valve 130, 140 of a capsule 200. In the example shown, the rod 221 was rotated through 90°, such that the closing web 237, when driven upward, can act on the rib 137 of the closure part 130 in order to close the valve 130, 140.

Figure 3A:
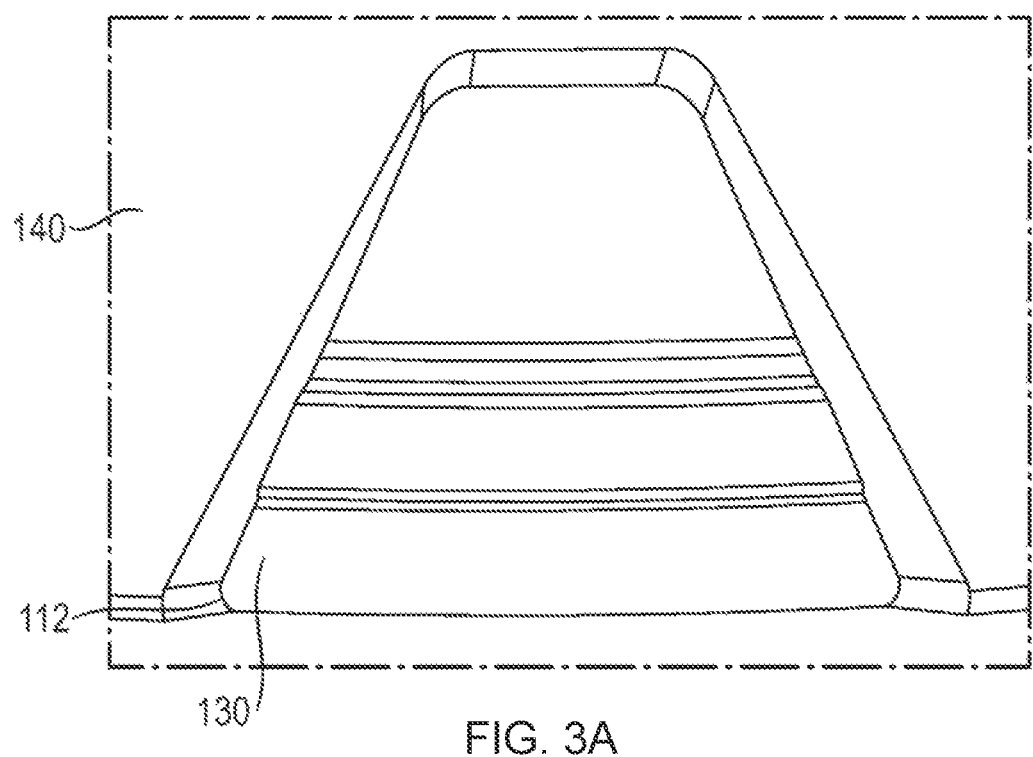
Figure 3B:
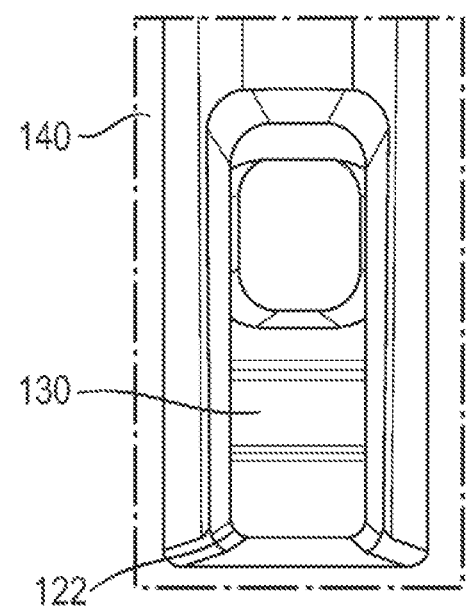

FIGS. 3a and 3b show examples of outlet openings 112, 121 for a main chamber 110 and for a secondary chamber 120. An outlet opening 112 can be broader at a lower edge than at an upper edge (see FIG. 3a), in order to ensure that the ingredients of a chamber 110 can be guided as completely as possible out of the chamber 110. Furthermore, the ratios of the outflow speeds of the ingredients can be modified in a flexible manner by different geometries of the outlet openings 112, 122.

At a lower end of the rod 221, the beverage system 200 can thus have a needle 222 for piercing the sealing foil 102 of a capsule 100. The beverage system 200 can open the valve 130, 140 by means of the closure part 130 of the valve 130, 140 being pressed downward by the rod 221, in particular by a liquid lancet. A shoulder 227 of the rod 221 presses onto an inwardly protruding rib 137 on the inner side of the closure part 130 of the valve 130, 140.

Furthermore, the rod 221 can have one or more closure elements 237. A closure element 237 serves to pull the closure part 130 of the valve 130, 140 up again after the beverage has been dispensed, so as to close the capsule 100. The one or more closure elements 237 can be designed as wings on the rod 221. After the one or more closure elements 237 have passed the rib 137 in the closure part 130 of the valve, the rod 221 can be rotated with the aid of a slotted guide (not shown) (see FIG. 2g in comparison to FIG. 2f). As the rod 221 is driven upward, the one or more closure elements 237 then carry the closure part 130 of the valve 130, 140 with them, in particular until the rod 221 is rotated back again by the slotted guide.

The capsule 100 can have an inner and/or an outer collar and also one or more partition walls. The collars and/or the partition walls can serve as sealing surfaces for the lid 102, in particular as a cover foil.

The outflow speed of the ingredients of the one or more chambers 110, 120 can be set via the depth of insertion of the closure part 130 of the valve 130, 140. As is shown in FIGS. 3a and 3b, the outlet openings 112, 122 of the one or more chambers 110, 120 can be opened wider or less wide by the position of the closure part 130. The volumetric flow of emerging ingredients can thus be modified.

Alternatively or in addition, the volumetric flow of the emerging ingredients can be controlled via the pressure of the flushing medium 261 at the inlet openings 111, 121.

By a corresponding geometry of the apertures or openings (in particular of the outlet openings) 112, 122 of a capsule 100, it is possible to influence the ratio between the outflow speed from the different chambers 110, 120. In addition, the different outlet openings 112, 122 of the different chambers 110, 120 can have different shapes (as shown in FIGS. 3a and 3b, for example), such that the ratio of the volumetric flows of the ingredients from the different chambers 110, 120 can be modified through the depth of insertion of the closure part 130 of the valve 130, 140. For example, in the example shown in FIG. 3b, the outlet opening 122 of the second (small) chamber 120 is limited by the size of the aperture in the closure part 130 of the valve 130, 140 and is constant, independently of the degree of opening of the valve 130, 140.

Through the use of a multi-chamber capsule 100, different substances or ingredients can be stored separately in different chambers 110, 120 of the capsule 100, as a result of which the ingredients of a capsule 100 can have a longer storage life.

By virtue of the design of a capsule 100 as described in this document, ingredients can be removed efficiently from a capsule 100 in order to produce a beverage.

Furthermore, by virtue of the measures described in this document, contamination of a beverage system 200 by the ingredients of a capsule 100 can be reliably avoided. This can be achieved in particular by the fact that the capsule 100 can be closed again after production of a beverage. Furthermore, by virtue of the described design of a capsule 100, contact between the rod 221 (in particular the lancet) and the ingredients of the capsule 100 can be avoided.

By means of a liquid 215 being delivered centrally from a beverage system 200, a liquid jet of high uniformity can be made available, which allows the ingredients of a capsule 100 to be mixed reliably with externally delivered liquids 215.

The described beverage system 200 uses a small number of needles 222. In the example shown in FIG. 2b, the beverage system 200 has just a single needle 222. In addition, it may be possible to dispense completely with the use of a needle 222, e.g. if the cavity 138 of the closure part 130 is not covered by the lid 102 of the capsule 100. The costs of a beverage system 200 can thus be reduced and user safety can be enhanced.

Through the use of a shaped second chamber 120 (see FIG. 1e for example), it is possible to define a unique insertion position of the capsule 100 in a capsule-receiving unit of a beverage system 200. Thus, errors when operating the beverage system 200 during insertion of a capsule 100 can be avoided.

The identification of a capsule 100 can be made by an optical feature and/or by NFC (near field communication) and/or by RFID (radio frequency ID). It is thus possible to provide several capsules 100 of different capsule types with different ingredients for the production of different types of beverages. The capsules 100 can have an identifier which indicates the capsule type and therefore the beverage that is to be produced. The beverage system 200, in particular the control unit 201, can be configured to determine the capsule type on the basis of the identifier. Furthermore, the control unit 201 can control the beverage production process as a function of the capsule type that is determined. Thus, beverages of different beverage types can be conveniently produced in one beverage system 200.

The capsule 100 can have means (e.g. mechanical means) by which re-use of an already used capsule 100 can be prevented. For this purpose, the shape of a capsule 100 can in particular be modified during the production of a beverage or during the use of a capsule 100, such that re-use is prevented. For example, a latching projection and/or a predetermined break point can be defined, which prevent the closure part 130 of the valve 130, 140 from being pushed back completely to the original output position.

As an alternative or in addition to the use of a translation valve 130, 140, a rotation valve can be used. In this case, the closure part 130 of the valve is designed in such a way that the corresponding openings 111, 121, 112, 122 to the chambers 110, 120 of the capsule 100 can be opened and closed by rotation of the closure part 130. The rod 221 can open and close the capsule 100 by a rotation of the closure part 130 and, if appropriate, can modify the outflow speed by changing the angle of opening.

Figure 4A:
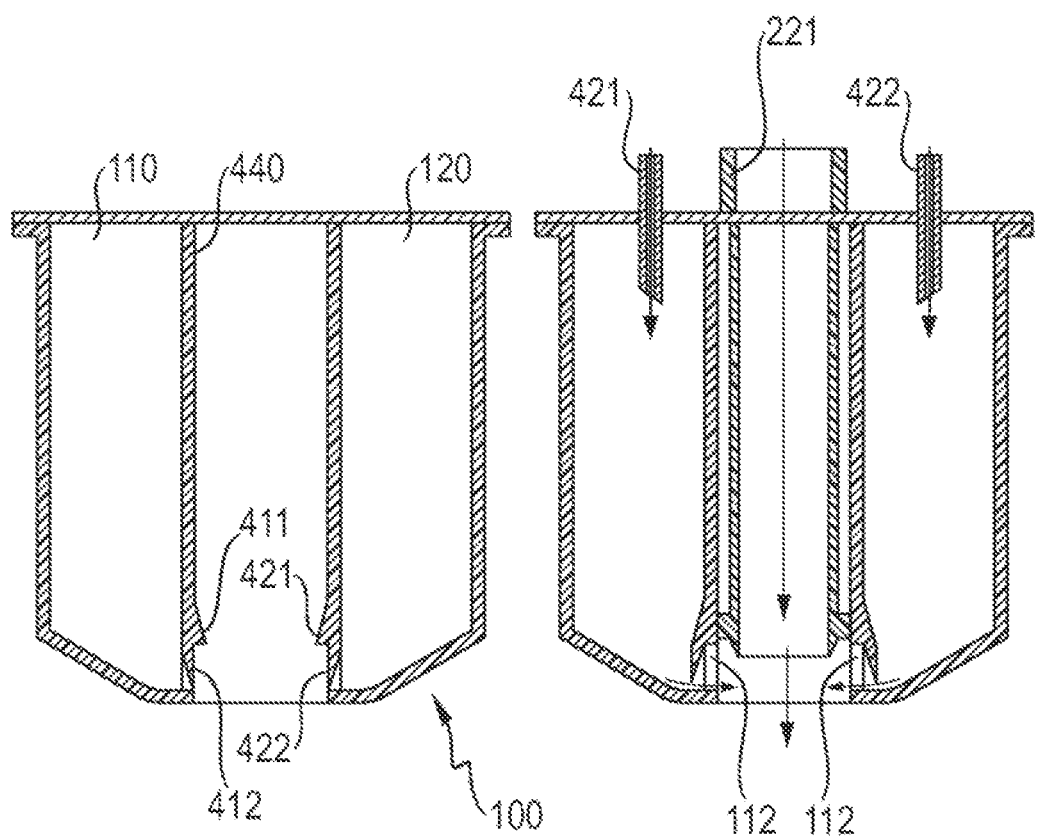
FIG. 4a shows an example of a capsule with a predetermined break point.

As is shown in FIG. 4a, the valve 130, 104 lying to the inside can be replaced by a continuous chamber wall 440 which is provided at the outlet with suitable flaps 412, 422. The flaps 412, 422 open and close the respective chambers 110, 120 of the capsule 100 and can be opened via predetermined break points 411, 412 by means of the rod 221. After a beverage has been dispensed, the rod 221 retreats from the capsule 100. The re-closing of the outlet openings 112, 122 can be effected automatically on account of the elasticity of the material of the chamber wall 440 and of the predetermined break points 411, 412.

The introduction of a flushing medium 261 into the one or more chambers 110, 120 of the capsule 100 in order to permit faster emptying can also be provided in this case. For example, as is shown in FIG. 4a, the lid 102 of the capsule 100 can be pierced in order to create openings into the one or more chambers 110, 120. Alternatively or in addition, predetermined break points can be provided in the wall 400 in the upper region of the capsule 100 and can be broken by the rod 221 in order to create inlet openings 111, 121 into the chambers 110, 120.

The outflow speed can be adjusted by opening a defined number of predetermined break points 411 or flaps 412 in a chamber 110. The individual predetermined break points 411 or flaps 412 can be opened and re-closed by a rotation of the rod 221, for example.

Figure 4B:
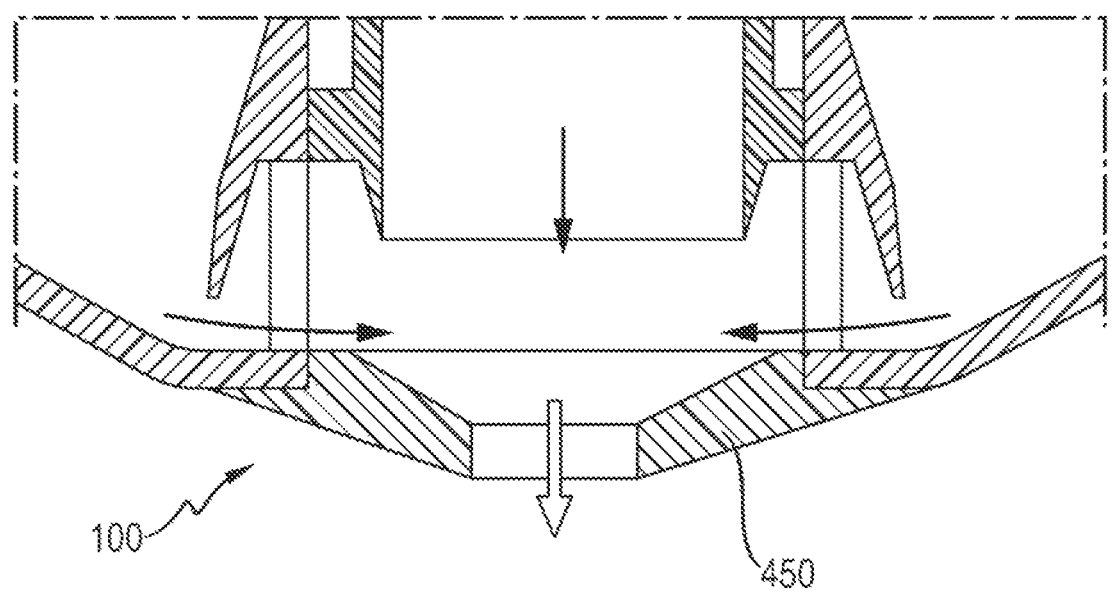
FIG. 4b shows an example of a capsule with a nozzle.

To focus the jet at the lower outlet of a capsule 100, a nozzle 450 can be used as an additional capsule component (see FIG. 4b).

The present invention is not limited to the illustrative embodiments shown. It will be noted in particular that the description and the figures are intended merely to illustrate the principle of the proposed system and/or of the proposed capsule.

The invention claimed is:

1. A capsule for holding ingredients for the production of a beverage, the capsule comprising:
    a capsule body at least partially covered, on a top side of the capsule, by a lid and enclosing a first chamber for holding a first ingredient and a second chamber for holding a second ingredient;
    a chamber wall enclosing a channel-shaped cavity extending from the top side of the capsule to a bottom side of the capsule, said chamber wall bordering said first chamber and said second chamber, and an outlet opening at the bottom side of the capsule, and
    a valve element configured to open a first outlet opening of said first chamber and a first outlet opening of said second chamber, in said chamber wall by a rod inserted into said cavity from the top side of the capsule, whereupon the first ingredient can flow out of the capsule from said first outlet opening of said first chamber via said cavity at the bottom side of the capsule and the second ingredient can flow out of the capsule from said first outlet opening of said second chamber via said cavity at the bottom side of the capsule;
    said chamber wall forming a valve housing of a valve of the capsule;
    said first outlet opening of said first chamber being a first aperture formed in said valve housing;
    said first outlet opening of said second chamber being a second aperture formed in said valve housing;
    said valve element forming a closure part of said valve of the capsule, said closure part including a closure part wall, which is within said channel-shaped cavity;
    said closure part being formed with at least two apertures in said closure part wall, and said at least two apertures can be aligned with said first outlet opening of said first chamber and said first outlet opening of said second chamber by a movement of said closure part relative to said valve housing, in order to open said first outlet opening and said second outlet opening; and
    said first outlet opening of said first chamber and said first outlet opening of said second chamber the capsule having different shapes, and said closure part being configured to change a ratio of the volumetric flows of said first ingredient and of the second ingredient by a movement of said closure part.

2. The capsule according to claim 1, wherein said at least two apertures in said closure part wall are arranged to enable:
    said at least two apertures to be aligned with said first outlet opening of said first and second chambers by a translational movement of said closure part toward the bottom side of the capsule, in order to open said first outlet opening of said first and second chambers;
    said at least two apertures to be moved from said first outlet opening of said first and second chambers by a translational movement of said closure part toward the top side of the capsule, in order to close said first outlet opening of said first and second chambers; and/or
    said at least two apertures to be aligned with said first outlet opening of said first and second chambers by a rotation movement of said closure part, in order to open said first outlet opening, of said first and second chambers and/or to be moved from said first outlet opening of said first and second chambers by a rotation movement of said closure part, in order to close said first outlet opening of said first and second chambers.

3. The capsule according to claim 1, wherein:
    said first outlet opening of said first chamber is arranged in a lower region of said valve housing facing toward the bottom side of the capsule;
    said valve housing, in an upper region facing toward the top side of the capsule, is formed with a first inlet opening to said first chamber, said first inlet opening being an aperture through said valve housing; and
    said closure part has an aperture in said closure part wall, which aperture can be aligned with said first inlet opening by a movement of said closure part relative to said valve housing, in order to open said first inlet opening.

4. The capsule according to claim 3, wherein said valve of the capsule, being formed by said valve housing and said closure part, is configured such that, by a movement of said closure part, said first outlet opening of said chamber and said first inlet opening are closed together or opened together.

5. The capsule according to claim 1, wherein said closure part comprises a contact device by which the rod, inserted from the top side of the capsule, is enabled to act on said closure part in order to move said closure part and press said closure part toward the bottom side of the capsule, to pull said closure part toward the top side of the capsule, and/or to rotate said closure part relative to said valve housing.

6. The capsule according to claim 5, wherein said contact device comprises a rib formed on an inner side of said closure part wall and configured to enable a shoulder of the rod to act on said rib in order to move said closure part, and to press said closure part toward the bottom side of the capsule.

7. The capsule according to claim 6, wherein said rib extending along the inner side of said closure part wall is formed with one or more gaps configured to enable:
one or more corresponding wings of the rod to be guided through said one or more gaps, when the rod is moved in a first rotational position from the top side of the capsule into said cavity; and/or
said one or more wings to act on said rib of said closure part in order to pull said closure part toward the top side of the capsule when the rod is moved in a second rotation position toward the top side of the capsule.

8. The capsule according to claim 1, wherein said valve of the capsule, being formed by said valve housing and said closure part, comprises one or more sealing elements configured to seal off an interspace between said valve housing and said closure part, both when said first outlet opening of said first chamber is closed and when said first outlet opening of said first chamber is opened, to assure that substantially no ingredients can pass from said first chamber into said interspace.

9. The capsule according to claim 1, wherein said closure part is configured to reclose said first outlet opening of said first chamber after said first outlet opening had been opened.

10. The capsule according to claim 1, wherein said closure part is made at least partially of a different material from said valve housing.

11. The capsule according to claim 1, further comprising a nozzle disposed on the bottom side of the capsule and configured to bundle a stream of liquid from said channel-shaped cavity.

12. The capsule according to claim 1, wherein said capsule body is asymmetric with respect to a rotation about a rotation axis extending along said channel-shaped cavity, to permit a unique orientation of the capsule with respect to a rotation about the rotation axis when inserted in a capsule holder.

13. The capsule according to claim 1, further comprising a sealing foil closing said channel-shaped cavity, at the top side and/or the bottom side of the capsule.

14. The capsule according to claim 1, wherein one or more of the following is true:
said chamber wall is designed as a pipe which extends from the top side of the capsule to the bottom side of the capsule; and/or
said pipe formed by said chamber wall extends substantially centrally through the capsule.

15. The capsule according to claim 1, wherein:
said first outlet opening of said second chamber is arranged nearer the top side of the capsule than said first outlet opening of said first chamber such that, initially, second ingredient emerging from said second chamber, and thereafter first ingredient emerging from said first chamber, mix with a liquid flowing from the top side to the bottom side of the capsule through said channel-shaped cavity; and
the second ingredient has a solubility, in the liquid flowing through said channel-shaped cavity, greater than a solubility of the first ingredient.

16. The capsule according to claim 1, wherein:
said first chamber has a greater holding capacity than said second chamber; and/or
a base of said first chamber reaches closer to the bottom side of the capsule than a base of said second chamber.

17. A beverage system for producing a beverage, the beverage system comprising:
a capsule according to claim 1 and a capsule support configured for holding the capsule according to claim 1, the capsule containing ingredients for producing the beverage;
a dispensing unit for making available a beverage produced on the basis of the ingredients in the capsule; and
an opening device configured to open the first outlet opening of the first and second chamber of the capsule held by said capsule support and to cause ingredients at the bottom side of the capsule to flow from the channel-shaped cavity of the capsule to the dispensing unit.

18. The beverage system according to claim 17, wherein said opening device comprises a rod which is configured to be guided from the top side of the capsule, held by said capsule support, into the cavity of the capsule, in order to open and/or reclose the first outlet opening of the first and second chamber of the capsule.

19. The beverage system according to claim 18, wherein:
said rod is a hollow rod formed with a liquid channel; and
the beverage system is configured to make available a liquid for the beverage at a top side of said liquid channel, wherein the liquid flows through the liquid channel to the channel-shaped cavity of the capsule and from there to the dispensing unit.

20. The beverage system according to claim 18, wherein said rod is formed with a shoulder which extends at least partially around the rod and which is configured to press on a rib of a closure part of the capsule, in order to move the closure part in a direction towards the bottom side of the capsule and in order thereby to open an outlet opening at the bottom side of the capsule.

21. The beverage system according to claim 20, wherein:
said shoulder is configured to close off the channel-shaped cavity in a fluid-tight manner above the rib of the closure part, to thereby form a sealed cavity above said shoulder; and
the beverage system is configured to convey a flushing medium into said first chamber via said sealed cavity and via a first inlet opening of the first chamber of the capsule.

22. The beverage system according to claim 20, wherein said rod comprises, on a side of said shoulder facing toward the capsule, one or more wings which are designed in such a way that, in a first rotation position of the rod, said wings can be guided through one or more corresponding gaps of said rib of said closure part and, in a second rotation position, can act on said rib during a movement of said rod toward the top side of the capsule, in order to pull said closure part toward the top side of the capsule.

23. The beverage system according to claim 22, wherein the beverage system, for producing a beverage, is configured:
to move said rod in the first rotation position in the direction of the bottom side of the capsule in order, by way of said shoulder, to press said closure part in the direction of the bottom side of the capsule, in order to open an outlet opening at the bottom of the capsule; and to move said rod in the second rotation position in the direction of the top side of the capsule in order, by way of said one or more wings, to pull said closure part in the direction of the top side of the capsule, in order to close the outlet opening at the bottom side of the capsule.

24. The beverage system according to claim 18, wherein said rod comprises, at a side facing toward the capsule, a needle which is configured to pierce a lid and/or a sealing foil covering the channel-shaped cavity.

* * * * *